United States Patent [19]

Krespan

[11] 3,860,611

[45] Jan. 14, 1975

[54] MACROCYCLIC POLYETHER POLYOLS AND CONDENSATION POLYMERS DERIVED THEREFROM

[75] Inventor: Carl G. Krespan, Wilmington, Del.

[73] Assignee: E. I. Du Pont de Nemours and Company, Wilmington, Del.

[22] Filed: Aug. 16, 1973

[21] Appl. No.: 388,834

Related U.S. Application Data

[63] Continuation-in-part of Ser. No. 218,000, Jan. 19, 1972, Pat. No. 3,763,188.

[52] U.S. Cl.............. 260/338, 260/75 R, 260/75 S, 260/77.5 AT
[51] Int. Cl............................................ C07d 19/00
[58] Field of Search................................... 260/338

Primary Examiner—Norma S. Milestone

[57] ABSTRACT

3,3-Bis(chloromethyl)oxetane condenses with polyethylene glycols to form macrocyclic polyethers containing one or two spirocyclic oxetane rings. Hydrolysis of the spirocyclic rings yields a diol in the case of a single oxetane ring, and a diol and a tetraol in the case where two oxetane rings are present. The diols can be condensed with diacids or diisocyanates to form polyesters and polyurethanes which complex metal ions. The tetraol can be used in these polymers as a crosslinking reagent.

8 Claims, No Drawings

MACROCYCLIC POLYETHER POLYOLS AND CONDENSATION POLYMERS DERIVED THEREFROM

RELATED APPLICATIONS

This application is a continuation-in-part of application U.S. Ser. No. 218,000 filed Jan. 19, 1972 now U.S. Pat. No. 3,763,188.

BACKGROUND OF THE INVENTION

1. Field of the Invention

This invention relates to novel polyols containing macrocyclic polyether rings, to condensation polymers of the same, and to complexes of said polymers with alkali metal cations.

2. The Prior Art

Polyesters and polyurethanes made by the condensation of diols with diacids (in the form of simple esters) and with diisocyanates are well known in the polymer art.

Pedersen, J. Am. Chem. Soc. 89, 7017 (1967) has described macrocyclic polyether compounds made by the condensation of catechol with polyalkylene glycols and has shown that such macrocyclic compounds selectively complex metal ions and in particular alkali metal cations.

S. Wazonek, J. Am. Chem. Soc. 75, 2573 (1953) discloses the Tollen reaction of formaldehyde and acetaldehyde in 50% ethylene glycol giving mainly ethylene glycol mono and diethers and traces of a compound believed to be

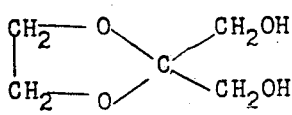

SUMMARY OF THE INVENTION

The present invention is directed to novel polyols having the formula

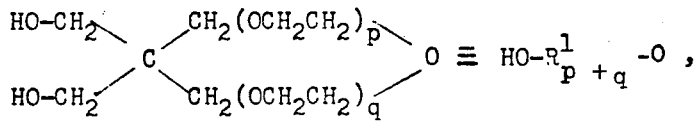

and

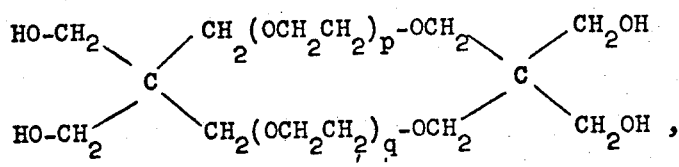

and

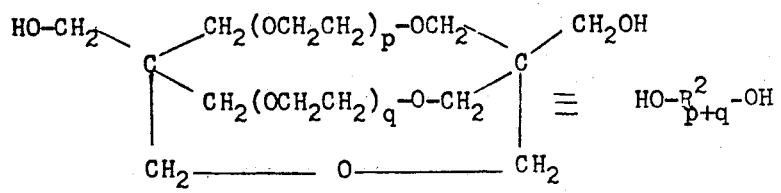

wherein $p$ and $q$, alike or different, are 1 to 9.

This invention also encompasses condensation polymers of the above diols having repeating units consisting essentially of

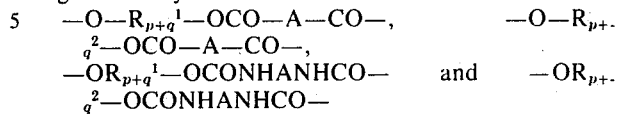

and mixtures thereof, wherein A is a hydrocarbon biradical of 4–22 carbon atoms with up to two oxa- or thia- substituents.

This invention is further directed to complexes of the above polymers with salts of metals, particularly alkali metals.

DETAILED DESCRIPTION OF THE INVENTION

In my copending, commonly assigned application, U.S. Ser. No. 218,000 filed Jan. 19, 1972 now U.S. 3,763,188, there are described macrocyclic polyethers having one or two oxetane rings. It is further disclosed that the macrocyclic compounds can be polymerized by opening of the oxetane rings with cationic initiators such as $BF_3$.

It has now been discovered that hydrolysis of the macrocyclic polyethers with one or two spirooxetane rings yields useful diols that can be polymerized to polyesters or polyurethanes with conventional co-reactants. The resultant polymers complex metal salts and in particular salts of the alkali metals.

The preparation of the starting materials for the compositions of the present invention is disclosed in detail in my aforesaid application Ser. No. 218,000. Briefly, the known compound 3,3-bis(chloromethyl)oxoetane (Farthing, J. Chem. Soc. 1955, 3648) is condensed with ethylene glycol or a polyethylene glycol in the presence of a strong base such as potassium t-butoxide or sodium hydride at a temperature preferably between 70°C and 120°C for periods of time ranging from a few hours to several days. The spiro- and dispirooxetanes are generally formed as a mixture, the proportions of which can be varied by varying the metal ion of the base. Extraction with liquid alkanes is particularly useful in isolating the products.

The general procedure for preparing the diol compounds is to reflux a 10% aqueous solution of the macrocyclic mono or dioxetane with 0.3–0.5% of concentrated sulfuric acid for 8 hours. The reaction mixture is then basified with barium hydroxide, the bulk of the water distilled, the residue saturated with carbon dioxide and filtered. The remaining water is evaporated and the product distilled or crystallized as is appropriate. Details are given in the specific embodiments described hereinafter.

The diols obtained from the spirooxetanes have the general formula

wherein $R_{p+q}^1$ is a biradical

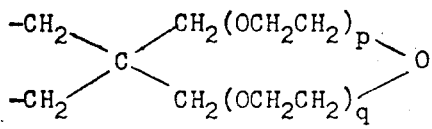

with $p$ and $q = 1$ to 9 inclusive. Generally $p + q$ is from 3 to 9 and preferably 3 to 5.

Hydrolysis of the dispirooxetanes yields a mixture of a tetraol and a diol having the formulae:

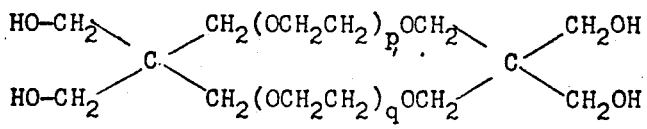

and

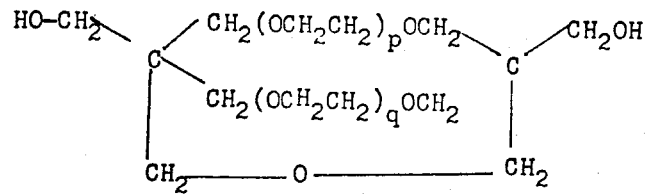

The diols derived from either the monospiro or dispirooxetane compounds form a wide variety of polyesters and polyurethanes which are capable of complexing with metal salts and in particular with alkali metal salts by virtue of the complexing ability of the macrocyclic polyether rings. Specific methods of making the diols are described hereinafter.

The tetraol can be employed, generally in minor amounts, in the aforesaid polymers as a crosslinking agent.

The polyesters are preferably made using esters such as the phenyl ester of the selected diacid mixed with the stoichiometric amount of diol and a suitable catalyst such as a mixture of anhydrous calcium acetate and antimony trioxide. The mixture is heated, generally to a temperature of about 200 to 250°C for a period of several hours, the phenol being removed continuously from the reaction vessel.

Preferred coreactants for making the polyesters are the diphenyl esters of alkane dioic acids wherein the alkylene group has from 4 to 22 carbon atoms, and the phenyl esters of dibasic aromatic acids derived from arylene groups having up to 16 carbon atoms and having two phenylcarboxylate groups attached directly to aromatic rings of an aromatic hydrocarbon. Some examples are: diphenyl 2-methylterephthalate, diphenyl 2,6-dimethyltetraphthalate, diphenyl methylenebis-p-benzoate, diphenyl 1,2-ethylenebis-p-benzoate, diphenyl 4,4'-biphenylenedicarboxylate, diphenyl 1,5-naphthalenedicarboxylate, diphenyl, 4,4'-biphenylenediacetate, diphenyl biphenyl-4,3'-dicarboxylate, diphenyl biphenyl 4,2'-dicarboxylate, diphenyl biphenyl 3,3'-dicarboxylate, diphenyl biphenyl-3,2'-dicarboxylate, diphenyl biphenyl-2,2'-dicarboxylate.

Polyurethanes can be made by heating the novel diols of this invention with a diisocyanate in a suitable solvent, generally at a temperature of about 100° to 150°C as shown in the examples. The isocyanates can be represented by the formula

wherein Y is a biradical derived from a hydrocarbon of 4 to 20 carbon atoms which can have up to two oxa- or thia- substituents. Examples of such Y radicals include: tetramethylene, 3-methyloctamethylene, 3-methoxyheptamethylene, 3-thiapentamethylene, 4-thiaheptamethylene, 4-oxaheptamethylene, 2,2-dimethylpentamethylene, decamethylene, dodecamethylene, 3-butoxyhexamethylene, 4,9-dioxadodecanethylene, 7-thiatridecamethylene, 1,2-cyclohexylene, 1,4-cyclohexylene, butenylene, methylenebis-p-phenylene, 1,2-ethylenebis-p-phenylene, 4,4'-methoxybiphenylene, 1,5-naphthalene, 4,4'-biphenylene, p-xylylene, p-phenylenebis(ethyl), 1,4-naphthylenebis(methyl), or 1,5-naphthalenebis(methyl).

While the polymers derived from the diols of the present invention polymerized with suitable diesters or diisocyanates represent preferred embodiments, further valuable polymers can be made by substituting a small amount, generally not more than 10% by weight, of aliphatic or aromatic diols for a part of the novel diols, e.g., by using a mixture of diols such as by including a small amount of ethylene glycol or other glycol for a part of the polyetherdiol. Modification to increase the Tg or melting point of a polymer can often be realized by substituting a portion of the diol or diphenyl ester reactant with an analog that has a phenylene group. Compare, for example, the Tg of the products:

| Example | Tg |
|---|---|
| B-1 | 22 |
| B-2 | -28 |
| C-1 | -10 |

The polymers of the present invention form complexes with many metal salts, and in particular salts of the alkali and alkaline earth metals by complexing the metal ion in the macrocyclic polyether rings. The complexes can be formed by exposing fibers or films of the novel polymers to aqueous solutions of the metal salts, or by contacting the salts in the solid state or in aqueous solution with a solution of the polymer in an organic solvent.

Since it is the cations which are complexed, the nature of the anions associated with the cations is less important in the formation of the complex. The salts which can be extracted there include simple inorganic salts such as halides, sulphates, nitrates, cyanides, isocyanates, borates, phosphates, fluoroborates, hydroxides, carbonates, permanganates and the like, complex salts such as ferrocyanides and organic salts such as formates, acetates, benzoates, salicylates and the like, and in particular, as mentioned hereinbefore, the alkali metal salts of the above anions.

The polymers complexed with metal salts are useful per se. Moreover, the complexing process of the compositions of this invention provides a method of recovering metals from solutions or of recovering undesired polluting salts from industrial wastes.

SPECIFIC EMBODIMENTS OF THE INVENTION

The invention is illustrated by the following specific embodiments which should not, however, be construed as fully delineating the scope of this discovery.

1.
12,12-Di(hydroxymethyl)-1,4,7,10-tetraoxacyclotridecane [$HOR_{p+q}^1$ OH with $p = 1$, $q = 2$]

A mixture of 6.5 g (0.028 mol) of 2,6,9,12,15-pentaoxaspiro[3.12]hexadecane, 25 ml of water, and 0.1 ml of concentrated $H_2SO_4$ was refluxed for 8 hours. The clear solution was neutralized with aqueous barium hydroxide, filtered, and the filtrate evaporated under reduced pressure until the residue crystallized. A sample from the crude product, 6.7 g (96%), had mp 72°–76°C. The product, 12,12-di(hydroxymethyl)-1,4,7,10-tetraoxacyclotridecane, was recrystallized twice from benzene/hexane to give 4.6 g, mp 80°–81°C (sinters 76°); ir (KBr): 2.94 (O—H, 3.38, 3.42 and 3.47 (sat. C—H), 9.0 (broad, C—O—C/COH); nmr (($CD_3$)$_2$CO): δ 3.59 (broad, shoulder) and 3.57 (3 with sh, singlet), 3.54 (1, singlet) and 3.49 ppm(1, singlet) with broad OH absorption apparent near 3.60 and 3.40 ppm.

Anal. Calcd for $C_{11}H_{22}O_6$: C, 52.78; H. 8.86; O, 38.35
Found: C, 53.34; H, 8.66; O, 38.74.

2.
15,15-Di(hydroxymethyl)-1,4,7,10,13-pentaoxacyclohexadecane [$HOR_{p+q}^1$ OH with $p = q = 2$]

Hydrolysis of 10.6 g of 2,6,9,12,15,18-hexaoxaspiro[3.15]nonadecane with dilute acid yielded 7.4 g (66%) of 15,15-di(hydroxymethyl)-1,4,7,10,13-pentaoxacyclohexadecane: bp 150°–152°C/0.4 μ; mp (crystallized from glyme) 52.5°–53.5°C; ir, 2.96 (OH), 3.43 (sat. OH), 8.8–9.1 (C—O—C); nmr (acetone-$d_6$), δ 3.62–3.53 ppm (m).

Anal. Calcd for $C_{13}H_{26}O_7$: C, 53.05; H, 8.90; O, 38.05
Found: C, 53.11; H, 8.62; O, 38.36.

3.
18,18-Di(hydroxymethyl)-1,4,7,10,13,16-hexaoxacyclononadecane [$HOR_{p+q}^1$ with $p = 2$, $q = 3$]

From 9.60 g of 2,6,9,12,15,18,21-heptaoxaspiro[3.18]docosane there was obtained by acid hydrolysis 5.6 g (55%) of 18,18-bis(hydroxymethyl)-1,4,7,10,13,16-hexaoxacyclononadecane: bp, 200°–218°C (0.1 μ); ir: 2.93 (OH); 3.46 (sat. CH), and 8.7–9.1 (C—O—C); nmr (acetone-$d_6$); δ 3.64–3.55 ppm (multiplet).

Anal. Calcd for $C_{15}H_{30}O_8$: C, 53.23; H, 8.94; O, 37.82
Found: C, 53.51; H, 8.89; O, 37.18.

4.
1,11-Di(hydroxymethyl)-3,6,9,13,16,19,22-heptaoxaoicyclo[9.9.3]triocosane [$HOR_{p+q}^2$ OH with $p = 2$, $q = 2$]

Acid hydrolysis of 9.0 g of 2,6,9,12,16,19,22,25-octaoxadispiro[3.9.3.9]hexacosane gave a mainly solid crude product. Three recrystallizations from ether by continuous Soxhlet extractions gave nearly pure 9,9,1-9,19-tetrakis-(hydroxymethyl)-1,4,7,11,14,17-hexaoxacycloeicosane mp 78.5°–80.5°C. Recrystallization from 1:1 ether/tetrahydrofuran gave 1.6 g (16%) of the tetraol; mp 80°–81°C; ir (nujol); 3.0 (broad OH) and 8.7–9.0 (C—O—C); nmr (acetone-$d_6$); δ 3.63–3.58 (multiplet and 2.92 ppm (s, OH).

Anal. Calcd for $C_{18}H_{36}O_{10}$: 52.41; H, 8.80; O, 38.79
Found: C, 52.77; H, 8.64; O, 38.75
52.89   8.55

An attempt to obtain a mass spectrum by direct introduction of solid sample gave only weak low mass peaks. Trimethylsilylation yielded a derivative that had a strong mass spectrum with a $p^+ = 700$, thus confirming the obtention of a tetrahydroxy product.

All the mother liquors were combined, evaporated to solid plus oil residue, and heated in a sublimer at 140°C (0.025 mm) for 3 days to give 1.55 g of solid, mp 114°–118°C. After an additional 4 days, there was obtained solid consisting of inner layer, 0.72 g, mp 85°–110°C, and a less volatile outer layer, 1.01 g, mp 77°–80°C. The combined higher melting fractions, 2.27 g gave 1.3 g (14%) of solid, mp 121°–123°C, on recrystallization from tetrahydrofuran. Two recrystallizations from 1:1 tetrahydrofuran/ether gave an analytical sample, 0.65 g, mp 123°–124°C; of 1,11-di(hydroxymethyl)-3,6,9,13,16,19,22-heptaoxabicyclo[9.9.3.]tricosane[2]: ir (nujol); 2.88 (OH) and 8.7–9.1 (C—O—C); nmr (acetone-$d_6$); δ 3.67–3.18 (multiplet, 16) and 2.82 ppm (s, 1, OH). Addition of $D_2O$ moved the OH peak to 3.92 ppm and greatly modified the rest of the spectrum.

| Anal. Calcd for $C_{18}H_{34}O_9$: | | | | | |
|---|---|---|---|---|---|
| | C, | 54.81; H, | 8.69; O, | 36.50; n.w., | 394 |
| Found: | C, | 55.79; H, | 8.66; O, | 36.75; n.w., | 394 (mass spec) |
| | | 55.71 | 8.65 | | |
| | | 55.46 | 8.56 | | |

Trimethylsilylation yielded in a product having a mass spectrum with a strong $p^+ = 538$, thus confirming the presence of two hydroxyl groups.

5. 12,12,25,25-Tetrakis(hydroxymethyl)-1,4,7,10,14,17,20,23-octaoxacyclohexacosane Acid hydrolysis of 23.2 g (0.05 mol) of 2,6,9,12,15,-19,22,25,28,31-decaoxadispiro[3.12.3.12]dotriacontane gave 23.8 g of viscous product which crystallized slowly, mp 56°–63°C. A 12-g sample, triturated and boiled with 200 ml and then with 100 ml of ether, gave 9.0 g (71%) of solid, mp 64°–67°C. Continuous extraction with ether gave an analytical sample of 12,12,25,25-tetrakis(hydroxymethyl)-1,4,7,10,14,17,20,23-octaoxacyclohexacosane: mp 70°–72°C, ir (nujol); 2.88 and 2.88 and 2.93 (OH), 8.7–9.2 (C—O—C); nmr (acetone-$d_6$) $\delta$ 3.63-3.53 (multiplet) and 2.87 ppm (s, OH). Addition of $D_2O$ caused loss of 2.87 peak and broad absorption under the multiplet.

Anal. Calcd for $C_{22}H_{44}O_{12}$: C, 52.78; H, 8.86; O, 38.35
Found: C, 52.56; H, 8.82; O, 38.44.

A 2:1 KSCN/tetraol complex was prepared in acetone and recrystallized from acetone, mp 134°–135°C; ir and nmr fit the proposed structure.

Anal. Calcd for $C_{24}H_{44}K_2N_2O_{12}S_2$:
C, 41.48; H, 6.38; K, 11.25; N, 4.03
Found: C, 41.31; H, 6.16; K, 10.70; N, 4.39.

B. Polyesters of the Type $$-O-R^1_{p+q}-O-CO-A-CO-$$

1. Polyterephthalate of 15,15-Di(hydroxymethyl)-1,4,7,10,13-pentaoxacyclohexadecane I: $p=q=2$, A = 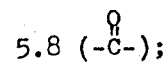

A mixture of 5.89 g of 15,15-di(hydroxymethyl)-1,4,7,10,13-pentaoxacyclohexadecane (III, $p=q=2$) and 6.37 g (0.02 mol) of diphenyl terephthalate (DPT), $19.11 \times 10^{-3}$ g of calcium acetate monohydrate (0.30% by weight based on DPT) and $6.37 \times 10^{-3}$ g of antimony trioxide (0.10% by weight based on DPT) was charged to a polymer tube with a side arm. This was heated at 220°C (using a methyl salicylate vapor bath) under a stream of nitrogen for 21 hours at a pressure of 30 mm. Further heating was continued for 14 hours at 220°C at a pressure of 0.05 mm. The polymer, which was stuck to the tube, was recovered by dissolving in chloroform and precipitating in hexane. The yield was quantitative. The polymer had an inherent viscosity ($\eta_{inh}$) of 1.42 (0.1% solution in chloroform) and a glass transition temperature (Tg) of 22°C. Transparent, flexible tough films were melt-pressed at 270°C. The polymer film could be drawn at 75° up to 4.5 times its original length. Mechanical properties of the film were: Eb (elongation) = 200%; Tb (tensile strength) = 2000 psi and Mi (initial modulus) = 300,000 psi. The volume resistivity was $4 \times 10^{13}$ ohm cm. Ir (KBr): 2.92 (—OH); 3.5 (sat. CH);

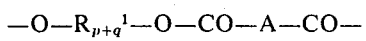
5.8 (-C-);

8.0 (broad), ester —CO—); 9.0 (broad —C—O—C—); 13.75 (substituted aromatic group).

Anal. Calcd for $C_{21}H_{28}O_9$: C, 59.42; H, 6.66
Found: C, 58.97; H, 6.82.

Films were prepared by solvent casting 10% solution of the polyester in chloroform. Three films were submitted for tests in permeation of hydrogen/methane mixtures of 39.7 psi gas pressure. The $H_2/CH_4$ values were 2.84, 1.83 and 1.81.

Crosslinking of the linear polyester by 12,12,25,25-tetrakis-(hydroxymethyl)-1,4,7,10,14,17,20,23-octaoxacyclohexacosane The polyester B-1 (2.039 g, 0.0048 mol) was reacted with 0.192 g (0.00048 mol) of 12,12,25,25-tetrakis(hydroxymethyl)-1,4,7,10,14,17,20,23-tetraoxacyclohexacosane using $6.12 \times 10^{-3}$ g calcium acetate monohydrate (0.30% based on polyester) and $2.04 \times 10^{-3}$ g antimony trioxide (0.10% based on polyester). The polymer tube was heated at 220° for 3 hr under a stream of nitrogen at a vacuum pressure of 5–10 mm. Further heating at 220° under a pressure of 0.10 mm was done for 12 hr. The resulting polymer weighed 1.50 g with the rest of the polymer stuck in the reaction tube. The polyester was now insoluble in chloroform, formic acid and hexafluoroisopropanol. Differential scanning calorimetry showed a change of Tg from 23° to 36°.

2. Poly-sebacate of 15,15-Di(hydroxymethyl)-1,4,7,10,13-pentaoxacyclohexadecane $p=q=2$, A = $-(CH_2)_8-$ Example B-1 was repeated, substituting an equivalent of diphenyl sebacate for the diphenyl terephthalate. The polymer was slightly tacky and rubbery: ($\eta_{inh}$) 1.30 (0.1% in chloroform); Tg = −28°; volume resistivity = $1.9 \times 10^9$ ohm cm. Ir (neat): 3.47 (sat. CH);

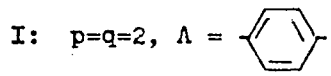
5.77 (-C-);

8.05 (ester —CO—); 8.93 (broad, —C—O —C—).

Anal. Calcd for $C_{23}H_{40}O_9$: C, 59.97; H, 8.77
Found: C, 59.27; H, 8.68.

3. Poly-isophthalate of 15,15-Di(hydroxymethyl)-1,4,7,10,13-pentaoxacyclohexadecane p=q=2, A = 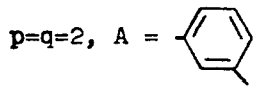

Example B-1 was repeated using an equivalent of diphenyl isophthalate in place of DPT. The inherent viscosity of the amorphous polymer (Tg = 44°) was 0.45 (0.1% solution in chloroform). A transparent, flexible film was obtained by pressing at 120°C. The film had a volume resistivity of $4.9 \times 10^{14}$ ohm cm. Ir (KBr): 2.9 (—OH); 3.5 (sat. CH);

5.8 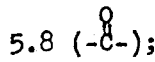

8.0 (broad, ester —CO—); 9.0 (broad, —C—O—C—); 13.75 (substituted aromatic group).

Anal. Calcd for $C_{21}H_{28}O_9$: C. 59.42; H, 6.66
Found: C, 59.03; H, 6.68.

4. Polyterephthalate of 18,18-Bis(hydroxymethyl)-1,4,7,10,13,16-hexaoxacyclononadecane p=2, q=3. A. = 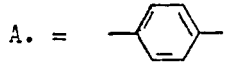

A mixture of 3.38 g (0.01 mol) of 18,18-bis-(hydroxymethyl)-1,4,7,10,13,16-hexaoxacyclononadecane, 3.18 g (0.01 mol) of diphenyl terephthalate, $9.56 \times 10^{-3}$ g of calcium acetate monohydrate and $3.19 \times 10^{-3}$ g of antimony trioxide was charged to a polymer tube. This was heated for 4 hours at 220°C under a stream of nitrogen at a pressure of 20 mm. Further heating was continued for 16 hours under a vacuum pressure of 0.25 mm. The polymer was dissolved in chloroform, precipitated in hexane and dried to give 3.75 g (40% yield). The inherent viscosity was 0.35 (0.1% in chloroform). Clear, transparent films were pressed at 150°C.

The polyester had a Tg of 20° and a volume resistivity of $2.7 \times 10^{12}$ ohm cm. IR (CHCl₃): 3.34, 3.47 μ (sat. CH); 5.82 μ

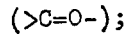

6.35, 6.65 μ (aromatic —C=C—); 7.92, 9.0, 9.82, 11.47 μ

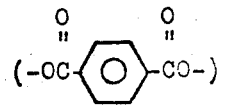

9.0 μ (broad, —C—O—C—).

Anal. Calcd. for $C_{23}H_{32}O_{10}$: C, 58.95; H, 6.90
Found: C, 58.48; H, 7.09.

5. Polysebacate of 18,18-Bis(hydroxymethyl)-1,4,7,10,13,16-hexaoxacyclononadecane Example B-3 was repeated using an equivalent of diphenyl sebacate for the diphenyl terephthalate. The polymer was tacky; soluble in chloroform; tg = −30°; $\eta_{inh}$ in chloroform = 0.65; volume resistivity = $6.4 \times 10^9$ ohm cm. IR (neat): 3.42, 3.48 μ (sat. CH); 5.75 μ

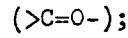

8.96 μ (broad, related to ester CO and ether C—O—C); 13.8 μ [(CH₂)₄ or more].

Anal. Calcd. for $C_{25}H_{44}O_{10}$: C, 59.49; H, 8.81
Found: C, 58.39; H, 8.66.

C. Copolyesters That Contain More Than One Diacyl Group p=q=2, A = 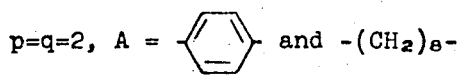

1. Example B-1 was repeated using 5.89 g (0.02 mol) of 15,15-di(hydroxymethyl)-1,4,7,10,13-pentaoxacyclohexadecane, 3.18 g (0.01 mol) of DPT and 3.54 g (0.01 mol) of diphenyl sebacate to give a rubbery polymer with a Tg = −10°C. The inherent viscosity was 1.18 (0.1% solution in chloroform). A film pressed at 120°C had a volume resistivity of $8.6 \times 10^{10}$. Ir (neat): 3.5 (sat. CH);

5.8 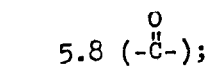

7.9 (broad, ester —CO—); 9 (broad, —C—O—C—); 13.72 (substituted aromatic group).

Anal. Calcd for $C_{44}H_{68}O_{18}$: C, 59.70; H, 7.76
Found: C, 59.46; H, 7.80.

2. Example C-1 was repeated replacing the diphenyl terephthalate with an equivalent of diphenyl isophthalate. The polymer had a Tg of 47° and an inherent viscosity of 0.38 (0.1% solution in chloroform). A film pressed at 120°C had a volume resistivity of 2.9 × 10$^{14}$ ohm cm. Ir (KBr): 2.95 (—OH); 3.48 (sat. CH);

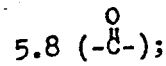

8.0 (broad, ester —CO—); 9.0 (broad, —C—O—C—); 13.75 (substituted aromatic group).

---

Anal. Calcd for $C_{42}H_{56}O_{18}$: C, 59.42; H, 6.66
Found: C, 59.31; H, 6.88.

---

D. Copolyesters Containing Mixed Diols

1. Polyterephthalate of 15,15-Di(hydroxymethyl)-1,4,7,10,13-pentaoxacyclohexadecane and Poly(tetramethylene) Glycol of 1000 Molecular Weight A mixture of 2.945 g (0.01 mol) of 15,15-di(hydroxymethyl)-1,4,7,10,13-pentaoxacyclohexadecane, 10 g (0.01 mol) of poly(tetramethylene glycol) ($m\,w = 1000$) and 6.37 g (0.02 mol) of DPT was polymerized according to Example B-1, to give an amorphous polymer (Tg = −68°C). Inherent viscosity was 0.96/0.1% solution in chloroform). Volume resistivity was 3.8 × 10$^{11}$ ohm cm. Ir (neat): 3.5 (sat. CH);

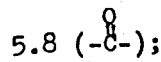

7.9 (ester -CO-); 9.0 (broad, -C-O-C-); 13.7 (substituted aromatic group).

E. Polyurethanes

These polymers are obtained by reaction of the macrocyclic polyetherdiols with diisocyanates, specific examples of which follow.

1. Polycondensation of 15,15-Di(hydroxymethyl)-1,4,7,10,13-pentaoxacyclohexadecane with methylene-bis-p-phenylene Diisocyanate The following mixture was refluxed at 116°C for 4 hours: 15,15-Di(hydroxymethyl)-1,4,7,10,13-pentaoxacyclohexadecane (2.94 g, 0.01 mol) in 5 ml of distilled dimethyl sulfoxide, 2.50 g (0.01 mol) of distilled methylenebis-p-phenylene diisocyanate dissolved in 5 ml of distilled methyl isobutyl ketone. The polymer was precipitated in hot $H_2O$, thoroughly washed with hot $H_2O$ to destroy any unreacted isocyanate groups and dried in vacuo at 50°C. The inherent viscosity was 0.18 (0.1% solution in chloroform).

---

Anal. Calcd for $C_{28}H_{36}N_2O_9$: C, 61.74; H, 6.68; N, 5.14
Found: C, 62.20; H, 7.03; N, 4.73.

---

2. Polycondensation of 1,11-Di(hydroxymethyl)-3,6,9,13,16,19,22-heptaoxabicyclo[9.9.3]tricosane and Methylenebis-p-phenylene Diisocyanate A 50-ml flask equipped with a thermometer, stirrer, condenser and nitrogen inlet was charged with 2.50 g (0.01 mol) of methylenebis-p-phenylene diisocyanate, 4 ml of distilled methyl isobutyl ketone, 3.94 g (0.01 mol) of 1,11-di(hydroxymethyl)-3,6,9,13,16,19,22-heptaoxabicyclo-[9.9.3]tricosane and 4 ml of distilled dimethyl sulfoxide and the mixture refluxed at 116°C for 1.5 hours. On cooling the mixture, the polymer separated as a white solid (6.4 g, 100% yield). The best solvent for the polymer was dimethylformamide containing 10% of lithium chloride. The $\eta_{inh}$ of the polymer was 0.61 (0.1% in m-cresol measured at 110°C). A transparent film was pressed at 240°C.

---

Anal. Calcd for $C_{33}H_{44}N_2O_4$: C, 61.47; H, 6.89; N, 4.35
Found: C, 62.28; H, 6.73; N, 4.48.

---

EXAMPLE F

Complexes of Polymers with Different Salts

Complexes with the various polyesters were prepared by dissolving 0.5 g of the polymer in 10 ml of chloroform, adding the salt and stirring for 24 hours at room temperature. The mixture was filtered and the filtrate evaporated. Films were pressed for volume resistivity measurements. Table I summarizes the volume resistivity values obtained at 200 volts for the various polyesters. Volume resistivities were greatly reduced by complexing B-1 and B-4 polyesters, especially with the salts of Na + K. B-2 and B-5 complexes similarly showed the same trend.

TABLE I

Volume Resistivity (ohm cm) of Various Polyester and Their Salt Complexes

| B-1 Polyester | | B-2 Polyester | | B-4 | | B-5 | |
|---|---|---|---|---|---|---|---|
| Control | Complex | Control | Complex | Control | Complex | Control | Complex |
| 5.8×10$^{13}$ | 9.7 × 10$^9$ (14% KSCN) | 1.9×10$^9$ | 3.3 × 10$^7$ (13% KSCN) | 3.7×10$^{12}$ | 4.4 × 10$^8$ (9.1% KSCN) | 6.4×10$^9$ | 2.0 × 10$^8$ (9.53% KSCN) |
| | 2.6 × 10$^{11}$ (14% NaSCN) | | 3.4 × 10$^8$ (10% NaSCN) | | 8.8 × 10$^7$ (8.8% NaSCN) | | |
| | 1.9 × 10$^{10}$ (1.8% LiCl) | | | | 7.0 × 10$^{10}$ (1.95% LiCl) | | |
| | 1.7 × 10$^{10}$ (0.83% AgHO$_3$) | | 4.8 × 10$^8$ (6.65% AgNO$_3$) | | 8.1 × 10$^9$ (4.24% AgNO$_3$) | | |
| | 1.1 × 10$^{11}$ (0.67% CuCl$_2$.2H$_2$O) | | 1.5 × 10$^9$ (3.59% CuCl$_2$.2H$_2$O) | | 2.7 × 10$^{10}$ (1.53% CuCl$_2$.2H$_2$O) | | |

TABLE I—Continued

Volume Resistivity (ohm cm) of Various Polyester and Their Salt Complexes

| B-1 Polyester | | B-2 Polyester | | B-4 | | B-5 | |
|---|---|---|---|---|---|---|---|
| Control | Complex | Control | Complex | Control | Complex | Control | Complex |
| | $3.5 \times 10^{11}$ (9.25% FeCl$_3$.6H$_2$O) | | $4.5 \times 10^8$ (1.16% FeCl$_3$.6H$_2$O) | | $4.0 \times 10^9$ (5.42% FeCl$_3$.6H$_2$O) | | |
| | $2.6 \times 10^{12}$ (0.10% BaCl$_2$.2H$_2$O) | | | | $1.6 \times 10^{12}$ (1.17% BaCl$_2$.2H$_2$O) | | |
| | $3.5 \times 10^{11}$ (0.02% KCl) | | $1.3 \times 10^{10}$ (0.17% KCl) | | | | |

I claim:

1. A polyol having the formula

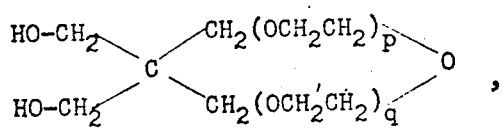

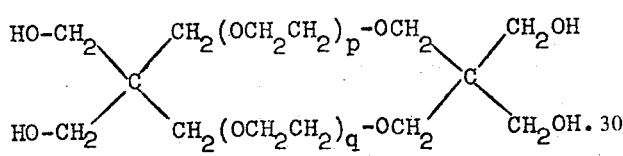

or

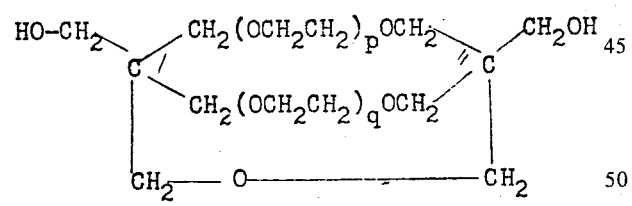

wherein $p$ and $q$, alike or different, are from 1 to 9.

2. A diol of claim 1 having the formula

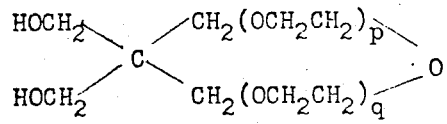

wherein $p$ and $q$, alike or different, are from 1 to 9.

3. Diol of claim 2 wherein $p = 1, q = 2$.
4. Diol of claim 2 wherein $p = 2, q = 2$.
5. Diol of claim 2 wherein $p = 2, q = 3$.
6. A diol of claim 1 having the formula

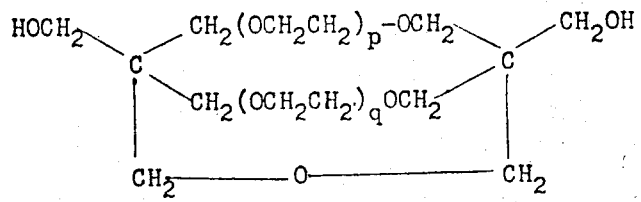

wherein $p$ and $q$, alike or different, are from 1 to 9.

7. Diol of claim 6 wherein $p = q = 2$.
8. The tetraol of claim 1 having the formula

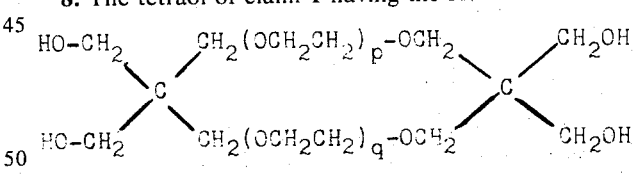

wherein $p$ and $q$, alike or different, are from 1 to 9.

* * * * *